United States Patent
Sakamoto

Patent Number: 6,088,480
Date of Patent: Jul. 11, 2000

[54] IMAGE FORMING APPARATUS AND IMAGE FORMING METHOD

[75] Inventor: Shoji Sakamoto, Nakai-machi, Japan

[73] Assignee: Fuji Xerox Co., Ltd., Tokyo, Japan

[21] Appl. No.: 08/996,219

[22] Filed: Dec. 22, 1997

[30] Foreign Application Priority Data

Jan. 8, 1997 [JP] Japan ................................. 9-001637

[51] Int. Cl.[7] .................................................. G06K 9/34
[52] U.S. Cl. .......................... 382/180; 382/238; 358/1.3; 358/401
[58] Field of Search ................................. 382/305, 180, 382/238; 358/401, 501, 529, 1.3; 395/103, 116; 345/435

[56] References Cited

U.S. PATENT DOCUMENTS

| | | | |
|---|---|---|---|
| 5,157,765 | 10/1992 | Birk et al. | 395/163 |
| 5,742,294 | 4/1998 | Watanabe et al. | 345/425 |
| 5,774,579 | 6/1998 | Wang et al. | 382/176 |
| 5,784,077 | 7/1998 | Silverbrook | 347/2 |
| 5,814,699 | 9/1998 | Kratz et al. | 525/53 |
| 5,841,900 | 11/1998 | Rahgozar et al. | 382/176 |
| 5,852,676 | 12/1998 | Lazar | 382/173 |
| 5,877,865 | 3/1999 | Fukuta | 358/296 |

FOREIGN PATENT DOCUMENTS

B2-8-10465  1/1996  Japan .

Primary Examiner—Matthew C. Bella
Assistant Examiner—Kanji Patel
Attorney, Agent, or Firm—Oliff & Berridge, PLC

[57] ABSTRACT

In an image forming apparatus which forms an image by parallel-processing an instruction set described in a page description language and in which image data can be efficiently processed by properly dividing the sequence of instructions for parallel-processing, interpreting means generates an intermediate representation independent of a language by interpreting an image plotting instruction described in a page description language according to a grammar of a page description language. The intermediate representation is divided into blocks according to a particle size designated by particle size designating means. Divided blocks are distributed by distributing means to converting means which can operate in parallel to each other and thereby converted into pixel representations. Partial converted pixel representations are synthesized by synthesizing means into a page image. Since the intermediate representation which results from interpreting the page description language is divided into blocks as described above, blocks of intermediate representations sharing an attribute can be correctly discriminated from each other.

9 Claims, 19 Drawing Sheets

```
clip ([C1] [rect] [50, 50, 300, 300])
attrib ([A1] [0.1] [0.0])
shape ([line] [75, 100, 300, 100] [A1] [C1])
shape ([line] [100, 75, 100, 300] [A1] [C1])
region ([rect] [150, 100, 25, 100] [A1] [C1])
region ([rect] [225, 100, 25, 150] [A1] [C1])
clip ([C2] [rect] [350, 50, 300, 300])
attrib ([A2] [0.1] [1.0])
attrib ([A3] [0.1] [0.5])
attrib ([A4] [0.1] [0.8])
region ([arc] [500, 200, 100, 90, 0] [A2] [C2])
region ([arc] [500, 200, 100, 290, 360] [A3] [C2])
region ([arc] [500, 200, 100, 90, 290] [A4] [C2])
shape ([arc] [500, 200, 100, 0, 360] [A1] [C2])
```

```
clip ([C1] [rect] [50, 50, 300, 300])
attrib ([A1] [0.1] [0.0])
shape ([line] [75, 100, 300, 100] [A1] [C1])
shape ([line] [100, 75, 100, 300] [A1] [C1])
region ([rect] [150, 100, 25, 100] [A1] [C1])
region ([rect] [225, 100, 25, 150] [A1] [C1])
```
~116

```
attrib ([A1] [0.1] [0.0])
clip ([c2] [rect] [350, 50, 300, 300])
attrib ([A2] [0.1] [1.0])
attrib ([A3] [0.1] [0.5])
attrib ([A4] [0.1] [0.8])
region ([arc] [500, 200, 100, 90, 0] [A1] [C2])
region ([arc] [500, 200, 100, 290, 360] [A3] [C2])
region ([arc] [500, 200, 100, 90, 290] [A4] [C2])
shape ([arc] [500, 200, 100, 0, 360] [A1] [C2])
```
~117

FIG.6C

```
0.1 setlinewidth
1 setgray
50 450 300 300 rectclip
75 500 moveto
300 500 lineto stroke
100 475 moveto
100 700 lineto stroke
175 500 25 100 rectfill
250 500 25 150 rectfill
/Helvetica 12 selectfont
initclip
250 500 300 250 rectclip
initclip
100 200 300 250 rectclip
300 700 moveto
(This is Graph 1.) show
150 400 moveto
(Here is) show
/Helvetica-Italic 12 selectfont
360 400 moveto
(Graph 2.) show
/Helvetica 12 selectfont
150 380 moveto
(2nd and 3rd lines of the second) show
(paragraph appear here.) show
initclip
300 150 300 300 rectclip
550 300 moveto
450 300 100 0 360 arc stroke
0 setgray
450 300 moveto
450 300 450 300 100 0 90 arc fill
0.8 setgray
450 300 moveto
450 300 100 90 200 arc fill
0.4 setgray
450 300 moveto
450 300 100 200 360 arc fill
```

```
clip ([C1] [rect] [50, 450, 300, 300]);
attrib ([A1] [0.1] [1.0]);
shape ([line] [75, 500, 300, 500] [A1] [C1]);
shape ([line] [100, 475, 100, 700] [A1] [C1]);
region ([rect] [175, 500, 200, 600] [A1] [C1]);
region ([rect] [250, 500, 275, 650] [A1] [C1]);

clip ([C2] [rect] [250, 500, 300, 250]);
font ([F1] [Helvetica] [12]);
text (["This is Graph 1."] [300, 700] [F1] [C2]);

clip ([C3] [rect] [100, 200, 300, 250]);
font ([F2] [Helvetica-Italic] [12]);
text (["Here is"] [150, 400] [F1] [C3]);
text (["Graph 2."] [360, 400] [F2] [C3]);
text (["2nd and 3rd lines of the second"] [150, 380] [F1] [C3]);
text (["paragraph appear here."] [150, 360] [F1] [C3]);

clip ([C4] [rect] [300, 150, 300, 300]);
attrib ([A2] [0.1] [0.0]);
attrib ([A3] [0.1] [0.8]);
attrib ([A4] [0.1] [0.4]);
region ([line, arc, close] [450, 300, 450, 300, 100, 0, 90] [A2] [C4]);
region ([line, arc, close] [450, 300, 450, 300, 100, 90, 200] [A3] [C4]);
region ([line, arc, close] [450, 300, 450, 300, 100, 200, 360] [A4] [C4]);
shape ([arc] [550, 300, 450, 300, 100, 0, 360] [A1] [C4]);
```

```
clip ([C1] [rect] [50, 450, 300, 300]);
attrib ([A1] [0.1] [1.0]);
shape ([line] [75, 500, 300, 500] [A1] [C1]);
shape ([line] [100, 475, 100, 700] [A1] [C1]);
region ([rect] [175, 500, 200, 600] [A1] [C1]);
region ([rect] [250, 500, 275, 650] [A1] [C1]);
```

213

```
clip ([C2] [rect] [250, 500, 300, 250]);
font ([F1] [Helvetica] [12]);
text (["This is Graph 1."] [300, 700] [F1] [C2]);
```

214

```
font ([F1] [Helvetica] [12]);
clip ([C3] [rect] [100, 200, 300, 250]);
font ([F2] [Helvetica-Italic] [12]);
text (["Here is"] [150, 400] [F1] [C3]);
text (["Graph 2."] [360, 400] [F2] [C3]);
text (["2nd and 3rd lines of the second"] [150, 380] [F1] [C3]);
text (["paragraph appear here."] [150, 360] [F1] [C3]);
```

215

```
attrib ([A1] [0.1] [1.0]);
clip ([C4] [rect] [300, 150, 300, 300]);
attrib ([A2] [0.1] [0.0]);
attrib ([A3] [0.1] [0.8]);
attrib ([A4] [0.1] [0.4]);
region ([line, arc, close] [450, 300, 450, 300, 100, 0, 90] [A2] [C4]);
region ([line, arc, close] [450, 300, 450, 300, 100, 90, 200] [A3] [C4]);
region ([line, arc, close] [450, 300, 450, 300, 100, 200, 360] [A4] [C4]);
shape ([arc] [550, 300, 450, 300, 100, 0, 360] [A1] [C4]);
```

FIG.12

```
clip ([C100] [rect] [10, 800, 30, 15]);
image ([import] ["FXLogo"] [C100]);
clip ([C110] [rect] [800, 40, 100, 15]);
image ([import] ["TDCLogo"] [C110]);
clip ([C120] [rect] [870, 25, 30, 15]);
image ([import] ["FXLogo"] [C120]);

clip ([C1] [rect] [50, 450, 300, 300];
attrib ([A1] [0.1] [1.0]);
shape ([line] [75, 500, 300, 500] [A1] [C1]);
shape ([line] [100, 475, 100, 700] [A1] [C1]);
region ([rect] [175, 500, 200, 600] [A1] [C1]);
region ([rect] [250, 500, 275, 650] [A1] [C1]);

clip ([C2] [rect] [250, 500, 300, 250]);
font ([F1] [Helvetica] [12]);
text (["This is Graph 1."] [300, 700] [F1] [C2]);

clip ([C3] [rect] [100, 200, 300, 250]);
font ([F2] [Helvetica-Italic] [12]);
text (["Here is"] [150, 400] [F1] [C3]);
text (["Graph 2."] [360, 400] [F2] [C3]);
text (["2nd and 3rd lines of the second"] [150, 380] [F1] [C3]);
text (["paragraph appear here."] [150, 360] [F1] [C3]);

clip ([C4] [rect] [300, 150, 300, 300]);
attrib ([A2] [0.1] [0.0]);
attrib ([A3] [0.1] [0.8]);
attrib ([A4] [0.1] [0.4]);
region ([line, arc, close] [450, 300, 450, 300, 100, 0, 90] [A2] [C4]);
region ([line, arc, close] [450, 300, 450, 300, 100, 90, 200] [A3] [C4]);
region ([line, arc, close] [450, 300, 450, 300, 100, 200, 360] [A4] [C4]);
shape ([arc] [550, 300, 450, 300, 100, 0, 360] [A1] [C4]);
```

FIG. 17

311
```
clip ([C100] [rect] [10, 800, 30, 15]);
image ([import] ["FXLogo"] [C100]);
clip ([C110] [rect] [800, 40, 100, 15]);
image ([import] ["TDCLogo"] [C110]);
clip ([C120] [rect] [870, 25, 30, 15]);
image ([import] ["FXLogo"] [C120]);
```

312
```
clip ([C1] [rect] [50, 450, 300, 300]);
attrib ([A1] [0.1] [1.0]);
shape ([line] [75, 500, 300, 500] [A1] [C1]);
shape ([line] [100, 475, 100, 700] [A1] [C1]);
region ([rect] [175, 500, 200, 600] [A1] [C1]);
region ([rect] [250, 500, 275, 650] [A1] [C1]);
```

313
```
clip ([C2] [rect] [250, 500, 300, 250]);
font ([F1] [Helvetica] [12]);
text (["This is Graph 1."] [300, 700] [F1] [C2]);
```

314
```
font ([F2] [Helvetica] [12]);
clip ([C3] [rect] [100, 200, 300, 250]);
font ([F2] [Helvetica-Italic] [12]);
text (["Here is"] [150, 400] [F1] [C3]);
text (["Graph 2."] [360, 400] [F2] [C3]);
text (["2nd and 3rd lines of the second"] [150, 380] [F1] [C3]);
text (["paragraph appear here."] [150, 360] [F1] [C3]);
```

315
```
attrib ([A1] [0.1] [1.0]);
clip ([C4] [rect] [300, 150, 300, 300]);
attrib ([A2] [0.1] [0.0]);
attrib ([A3] [0.1] [0.8]);
attrib ([A4] [0.1] [0.4]);
region ([line, arc, close] [450, 300, 450, 300, 100, 0, 90] [A2] [C4]);
region ([line, arc, close] [450, 300, 450, 300, 100, 90, 200] [A3] [C4]);
region ([line, arc, close] [450, 300, 450, 300, 100, 200, 360] [A4] [C4]);
shape ([arc] [550, 300, 450, 300, 100, 0, 360] [A1] [C4]);
```

FIG.18

IMAGE FORMING APPARATUS AND IMAGE FORMING METHOD

BACKGROUND OF THE INVENTION

1. Field of the Invention

The present invention relates to image forming apparatus and image forming method, and particularly to image forming apparatus and image forming method in which an image can be efficiently formed by properly dividing a sequence of instructions when image information is formed by executing a sequence of instructions described by a language expressing a document.

2. Description of the Related Art

In order to print out a document expressed by a page description language at high speed, there is required a system which may interpret and execute a description based on a page description language at high speed. To construct a system of which the processing speed exceeds a limit of a processing speed of a single processor, it is necessary to realize a system which may execute parallel processing on a multiprocessor.

On the other hand, a document created by a user is converted into an existing page description language which is designed to be executed sequentially, and sent to a printer. In order to efficiently interpret and execute the expression based on such page description language on the multiprocessor system, it is necessary to properly distribute units that can be executed in parallel to individual processors.

A typical processing of a sequential execution type page description language is executed by repeating an operation of one page in which a plotting instruction is specified by interpreting inputted data, a partial graphic form is plotted by supplying plotting data to the plotting instruction, and the partial graphic forms are accumulated and stored. In order to execute the above-mentioned processing in parallel, inputted data has to be divided into proper units in the input interpreting processing, these proper units have to be distributed to and parallel-processed by a plurality of processors for executing plotting operations and have to be collected as one page in the processing for accumulating these processed results. Japanese Published Unexamined patent application No. Hei 8-10465, for example, describes a system for executing such processing. According to this previously-proposed system, an inputted data stream is divided into blocks, blocks are converted into intermediate format data by interpreting contents of the blocks, a raster pixel map is generated from the intermediate format data and raster data is generated from the page description language by sorting and synthesizing the raster pixel map. The processing from the interpreting processing to the sort processing is executed by a plurality of pipelines which are operated in parallel.

In the method described in Japanese Published Unexamined patent application No. Hei 8-10465, the data stream inputted to the system as inputted data is divided into state-independent blocks, and a high-speed processing may be realized by interpreting the divided blocks in parallel. However, according to this previously-proposed method, it is difficult to construct the system in actual practice due to the following two reasons. Specifically, in the first reason, it is difficult to divide the page description language representation which appears on the inputted data stream into state-independent blocks by a simple symbolic manipulation. A plotting command of a page description language executes an operation with reference to a variety of attribute values, and these attribute values are modeled as the states of a language processing system. Therefore, although the states of the language processing system have to be predicted in order to discriminate the state-independent blocks, it is difficult to realize this operation by only the symbolic manipulation. In the second reason, the loads on the pipelines of the succeeding stages are not taken into consideration, and it is frequently observed that loads for processing divided blocks are not dispersed equally. To generate image data of one page which can be printed out, the processing of the pipelines which require a longest time period is inevitable for such processing. Therefore, unless the loads are dispersed equally, there is then the problem that the standby time will increase so that effects achieved by the parallel-processing will be ruined.

SUMMARY OF THE INVENTION

In view of the aforesaid aspect, it is an object of the present invention to provide an image forming apparatus and an image forming method in which a practical system can be made by properly selecting targets that should be divided into blocks.

In order to solve the aforesaid problem, according to the present invention, there is provided an image forming apparatus in which an output image is obtained by executing an image plotting command described in a page description language. The image forming apparatus comprises interpreting means for generating an intermediate representation independent of a language by interpreting a representation based on an inputted page description language in accordance with a grammar of the page description language, dividing means for dividing the generated intermediate representation of a format independent of the language into blocks, particle size designating means for designating a particle size used when the intermediate representation is divided by the dividing means into blocks, a plurality of converting means for converting the divided blocks of the intermediate representation into pixel representations, distributing means for distributing the blocks of the intermediate representation divided by the dividing means to a plurality of converting means, and synthesizing means for synthesizing pixel representations generated by a plurality of converting means.

According to such image forming apparatus, the interpreting means interprets the representation based on the inputted page description language in accordance with a method dependent on the language and uses the intermediate representation of the format independent of the language as a target which should be divided into blocks. The dividing means divides the intermediate representation into blocks at a particle size designated by the particle size designating means and the distributing means distributes the respective blocks of the divided intermediate representation to a plurality of converting means. The converting means generate pixel representations from the intermediate representations of the distributed blocks, and the synthesizing means forms a desired image by synthesizing partial pixel representation to page data. When the dividing means divides the intermediate representation into blocks, blocks of the same attribute or blocks sharing a set of attributes or blocks using the same system resource are collected into one block. When a sum of predicted loads of the plotting elements appearing in the blocks exceeds a threshold value, the block is further divided into blocks. As described above, the blocks of the intermediate representations sharing the attribute can be discriminated correctly and the size of the block can be adjusted in such a manner that the load becomes equal. Thus, a standby time of pipeline which operates in parallel can be reduced, and an operation efficiency can be improved.

Further, according to the present invention, there is provided an image forming method in which an output image is obtained by executing an image plotting command described in a page description language. The image forming method comprises the steps of generating an intermediate representation independent of a language by interpreting a representation based on an inputted page description language in accordance with a grammar of the page description language, dividing the generated intermediate representation of the format independent of the language in accordance with a previously-designated particle size, distributing the divided intermediate representations to a plurality of pipelines which are operated in parallel to thereby convert the divided intermediate representations into pixel representations, and generating image data by synthesizing converted pixel representations.

According to such image forming method, the inputted page description language is temporarily interpreted and converted into an intermediate representation independent of the language. Then, the intermediate representation is used as a target that should be divided. The intermediate representation is divided into blocks at a designated particle size. At that time, the intermediate representation is divided into blocks in such a manner that intermediate representations of the same attribute or intermediate representations sharing a set of attributes or intermediate representations using the same system resource are collected into one intermediate representation. When a sum of predicted loads of the plotting elements appearing in the intermediate representations exceeds a threshold value, the intermediate representation is further divided into intermediate representations. Then, the divided intermediate representations are properly distributed into a plurality of pipelines which are operated in parallel, converted into pixel formats and synthesized by a page memory, thereby resulting in a desired image being formed.

BRIEF DESCRIPTION OF THE DRAWINGS

FIGS. 4A to 4C are diagrams showing an example of an internal representation of an intermediate format generated from a page description language, wherein FIG. 4A shows a graphic form, FIG. 4B shows an example of a description based on a page description language, and FIG. 4C shows an example of an internal representation, respectively;

FIGS. 6A to 6C are diagrams showing the manner in which an internal representation is divided into blocks, wherein FIG. 6A shows a plotted graphic form, FIG. 6B shows an example of an internal representation of the plotted graphic form, and FIG. 6C shows the manner in which the internal representation is divided into blocks, respectively;

FIG. 10 is a diagram showing the manner in which a document is converted into a representation based on a page description language;

FIG. 11 is a diagram showing an internal representation generated by an instruction analyzing unit;

FIG. 12 is a diagram showing an internal representation divided into blocks;

FIG. 17 is a diagram showing an internal representation generated by an instruction analyzing unit; and FIG. 18 is a diagram showing an internal representation divided into blocks.

DESCRIPTION OF THE PREFERRED EMBODIMENTS

The present invention will hereinafter be described with reference to the drawings.

Figure 1:
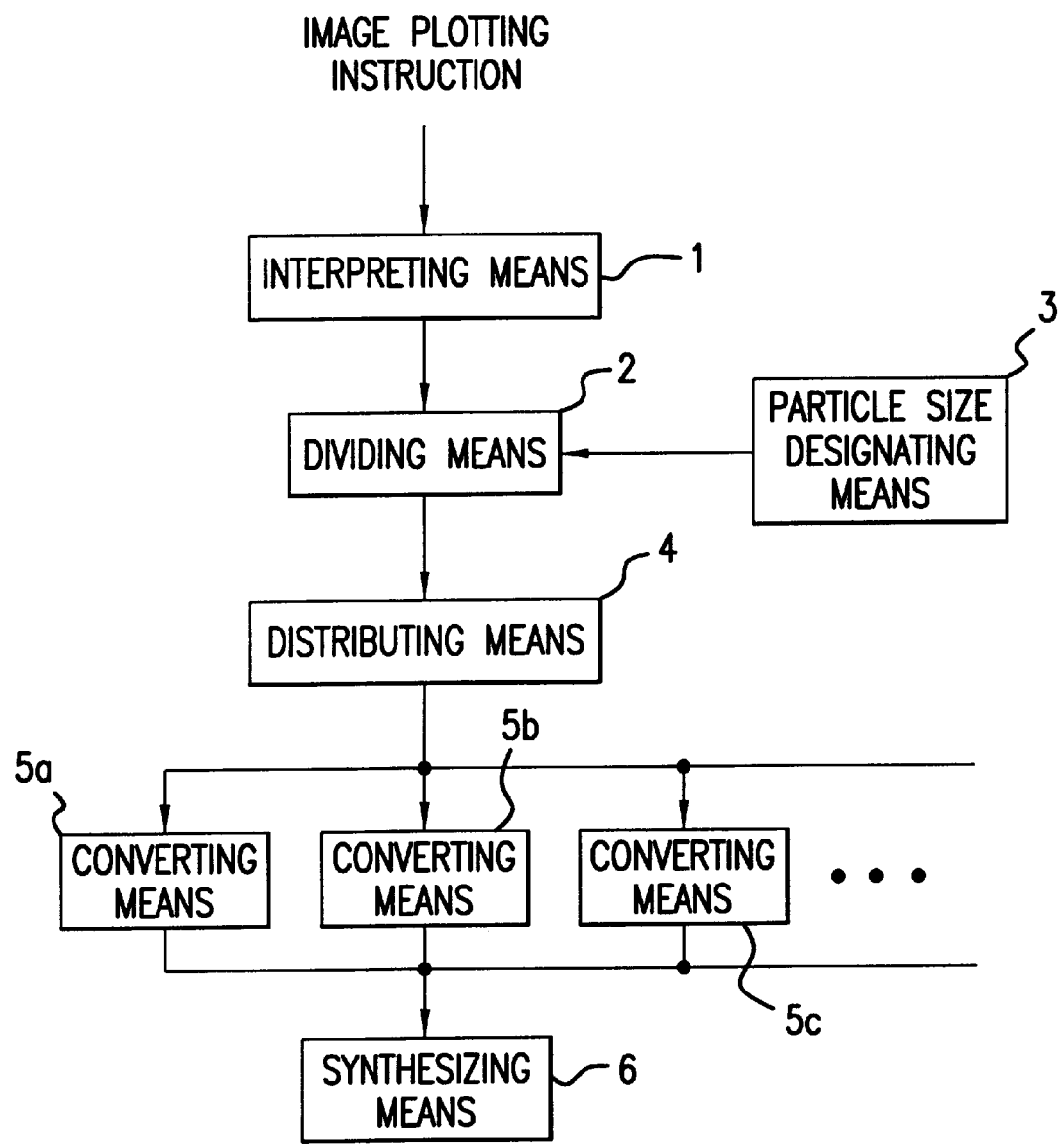
FIG. 1 is a block diagram showing a principle of the present invention.

FIG. 1 of the accompanying drawings is a block diagram showing a principle of the present invention. As shown in FIG. 1, an image forming apparatus according to the present invention comprises an interpreting means 1 for receiving an image plotting instruction described in a page description language, a dividing means 2 for receiving an output of the interpreting means 1, a particle size designating means 3 connected to the dividing means 2, a distributing means 4 connected to an output of the dividing means 2, a plurality of converting means 5a, 5b, 5c, . . . connected to the distributing means 4 so as to receive an output from the distributing means 4, and a synthesizing means 6 connected to these converting means 5a, 5b, 5c, . . . so as to receive outputs of the converting means 5a, 5b, 5c, . . .

When an image plotting instruction is inputted into the interpreting means 1, the interpreting means 1 interprets a representation based on a page description language which describes the image plotting instruction in accordance with the page description language and generates an intermediate representation independent of the page description language as a result of interpretation.

The interpreting means 1 for executing the above-mentioned operation comprises two stages in detail. In the first stage, inputted data is interpreted in accordance with its grammar, whereby a processing system determined in a language specification is operated to interpret the supplied image plotting instruction. In the second stage, an intermediate representation of a format independent of the grammar of the page description language is formed by using the interpreted result obtained at the first stage. Plotting graphic data which is information representing a plotting graphic form itself is specified, and attribute data to which the plotting graphic data refers are collected from attribute data retained in the internal structure of the interpreting means, thereby generating an intermediate representation of a format independent of the grammar of the language. At that time, if a reference relationship implicitly described in the context of the inputted data is specified, then it becomes possible to describe a meaning of certain data in the form independent of preceding and succeeding data. This intermediate representation does not specify a particular operation on respective data unlike the language of the inputted data. The intermediate representation which is independent of the language and which is generated by the interpreting means 1 contains plotting graphic data and attribute data, and the plotting graphic data contains reference attribute information which is used to specify reference attribute data. The intermediate representation thus generated is supplied to the dividing means 2. The dividing means 2 monitors attribute data to which plotting graphic data refers and a load predicted by the loading predicting means, and divides inputted data into other blocks when a target attribute value is changed or the load predicted by the load predicting means exceeds a threshold value. Alternatively, the dividing means 2 monitors a resource used by the plotting graphic data and the load predicted by the load predicting means, and divides inputted data into other blocks when the resource to be used is different or the load predicted by the load predicting means exceeds a threshold value. The divided blocks are properly distributed by the distributing means 4 to a plurality of converting means 5a, 5b, 5c, . . . which are able to operate in parallel to each other, thereby generating pixel representations representing a part of a page. The partial pixel representations thus generated are inputted to the synthesizing means 6 and thereby synthesized to a page image.

Thus, since the inputted data in the form of the page description language is converted into the intermediate representation which is independent of the language and then divided into blocks, the blocks based on the intermediate representation sharing the attributes can be discriminated correctly. Further, by adjusting the size of the blocks in such a manner that the load becomes equal, the standby time of the pipelines which operate in parallel to each other can be reduced, and an efficiency in operation is improved.

An embodiment in which the present invention is applied to a network printing system will be described below.

Figure 2:
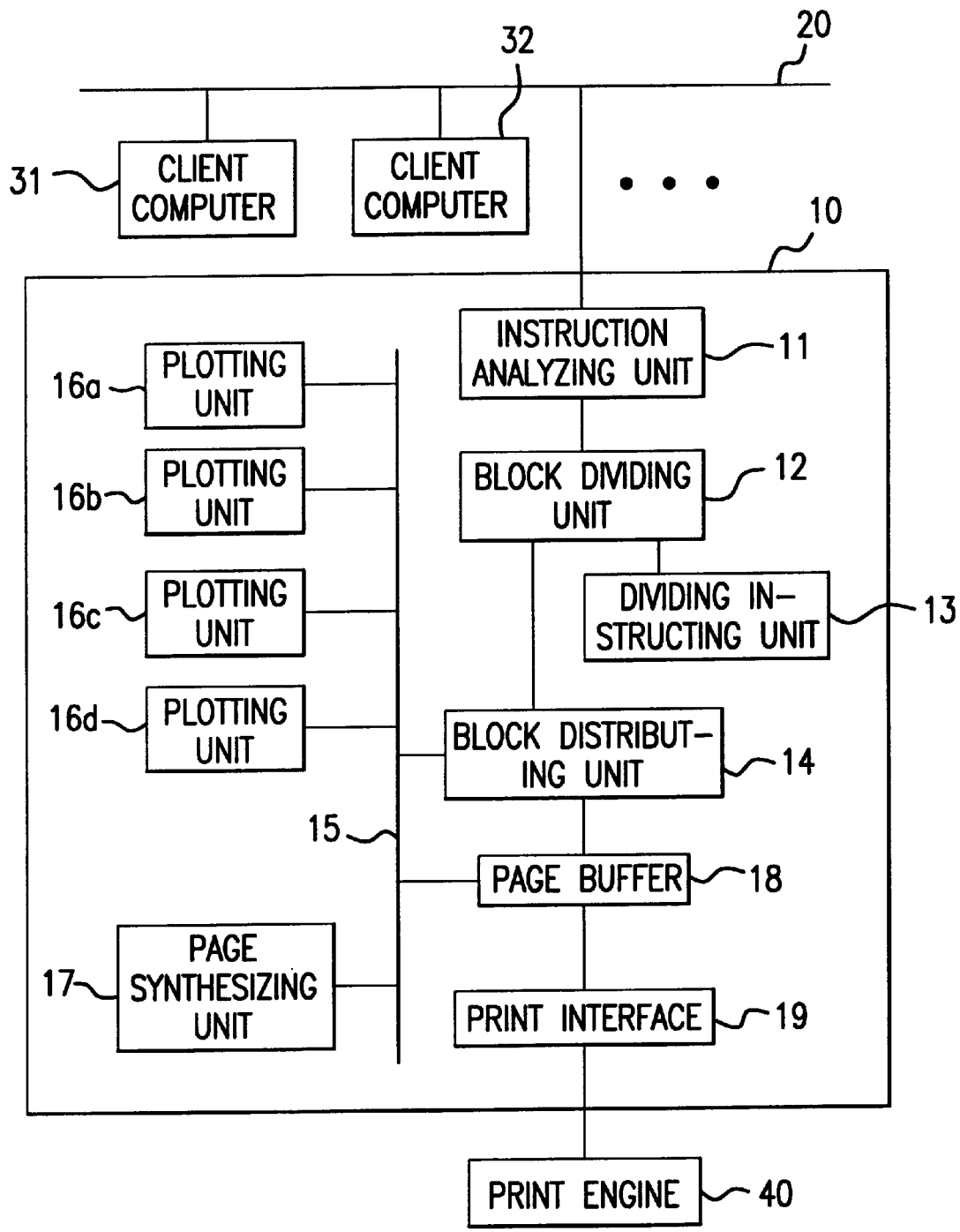
FIG. 2 is a block diagram showing a network printing system.

FIG. 2 is a block diagram showing a network printing system. As shown in FIG. 2, an image forming apparatus 10 according to the present invention is connected through a network 20 to a plurality of client computers 31, 32, . . . The image forming apparatus 10 comprises an instruction analyzing unit 11 connected to the network 20 so as to receive print jobs issued from the client computers 31, 32, . . . , a block dividing unit 12 connected to the instruction analyzing unit 11 so as to receive an output from the instruction analyzing unit 11, a dividing instruction unit 13 connected to the block dividing unit 12 so as to supply an instruction to the block dividing unit 12, a block distributing unit 14 connected to the block dividing unit 12 so as to receive an output from the block dividing unit 12, four plotting units 16a, 16b, 16c, 16d connected to the block distributing unit 14 through a bus 15, a page synthesizing unit 17 and a page buffer 18 connected to the bus 15 and a print interface 19 connected to the page buffer 18 so as to receive an output from the page buffer 18. An output from the print interface 19 of the image forming apparatus 10 is connected to a print engine 40.

Figure 3:
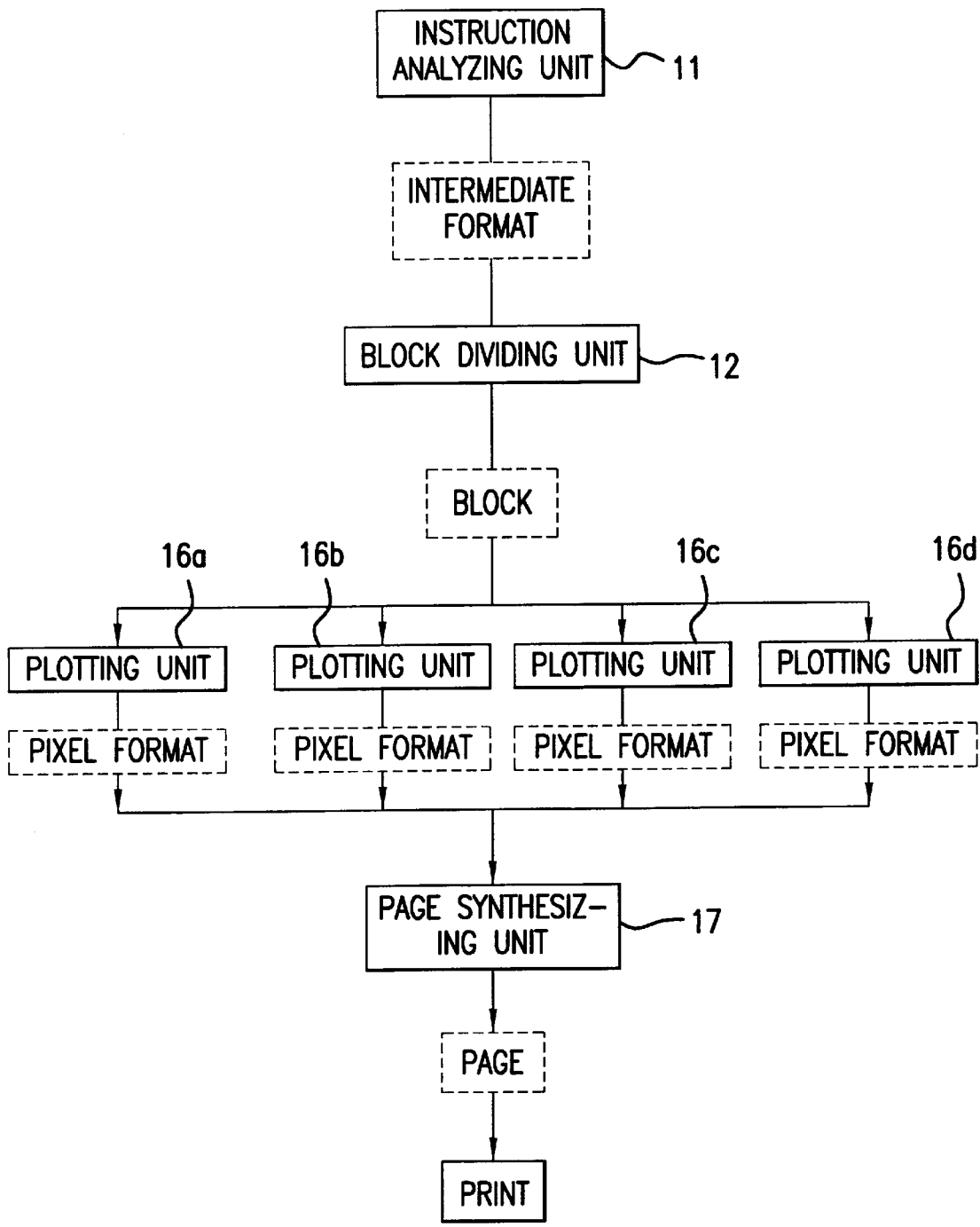
FIG. 3 is a diagram showing a flow of a processing executed by an image forming apparatus.

According to the above-mentioned arrangement, print jobs created by the client computers 31, 32, . . . are supplied through the network 20 to the instruction analyzing unit 11 of the image forming apparatus 10. The instruction analyzing unit 11 interprets the contents of the received print jobs in accordance with the grammar of the page description language, and generates an internal representation of an intermediate format which is not dependent upon the page description language. The internal representation thus generated is supplied to the block dividing unit 12, in which it is divided into blocks in accordance with a standard instructed by the dividing instruction unit 13 and supplied to the block distributing unit 14. The block distributing unit 14 distributes the received block to any one of a plurality of plotting units 16a, 16b, 16c, and 16d. The plotting units 16a, 16b, 16cand 16d which are operated in parallel to each other are adapted to plot images in accordance with the internal representations contained in the blocks distributed from the block distributing unit 14. The page synthesizing unit 17 extracts plotted results from the plotting units 16a, 16b, 16c, and 16d and records the extracted plotted results at predetermined positions of the page buffer 18, thereby generating an image of one page on the page buffer 18. The image thus generated is supplied through the print interface 19 to the print engine 40 and thereby printed out. FIG. 3 shows a flow of a processing executed by the image forming apparatus 10.

FIG. 3 shows a flow of a processing executed by the image forming apparatus 10. Initially, the instruction analyzing unit 11 interprets the representation based on the page description language in accordance with the language specification, and generates the internal representation of the intermediate type which is not dependent on the language specification as an interpreted result. The internal representation comprises plotting elements such as graphic form, text data and image data and attributes to which these plotting elements refer.

Figure 4A:
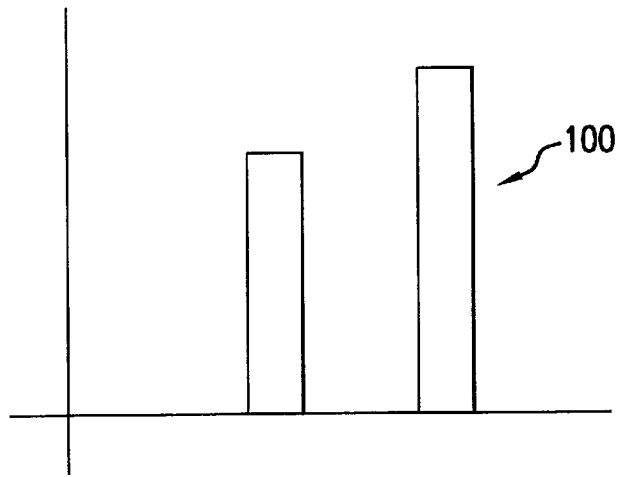
Figure 4B:
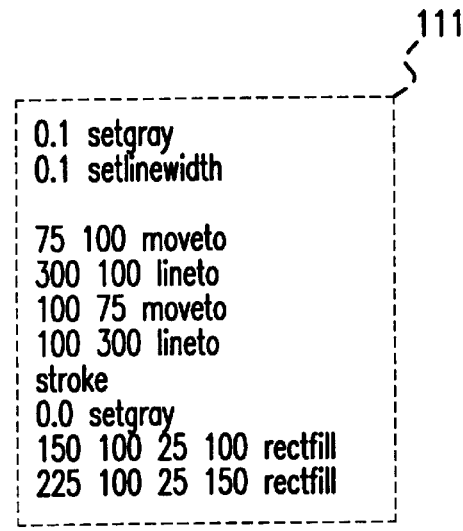
Figure 4C:
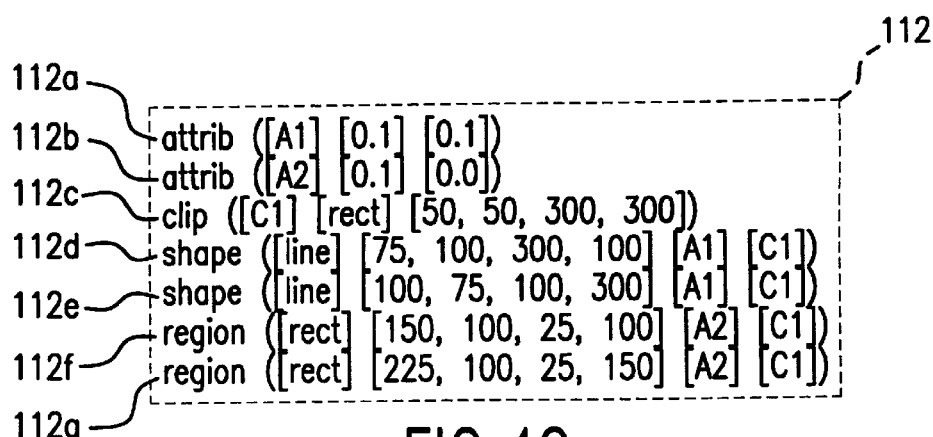

FIGS. 4A, 4B, 4C show examples of the internal representations of the intermediate type generated from the instruction analyzing unit 11. FIG. 4A shows a graphic form to be plotted; FIG. 4B shows an example of data described based on the page description language; and FIG. 4C shows an example of an internal representation. In this example, when a plotting graphic form 110 shown in FIG. 4A is printed out, a page description language which represents the plotting graphic form 110 is expressed by a page description language representation 111 shown in FIG. 4B. This page description language representation 111 is a representation based on PostScript (trademark or registered trademark owned by Adobe Systems Co., Ltd. in U.S. and other countries, and it will not be referred to hereinafter). When the instruction analyzing unit 11 analyzes this page description language representation 111, the page description language representation 111 is converted into the internal representation 112 of the intermediate format shown in FIG. 4C.

In the internal representation 112, descriptions 112a and 112b represent a set of attribute values. A first element (A1, A2) of a set of attribute values denotes a name of this set, a second element denotes a stroke width, and a third element denotes a color value. A description 112c denotes a clip, in which a first element denotes a name, a second element denotes a graphic element set, and a third element denotes a parameter set. In the description 112c, the parameter set represents that a displayed image is clipped by a rectangle area having a width of 300 and a height of 300 having a lower left vertex of coordinates (50, 50). Descriptions 112d and 112e represent line graphic forms, in which a first element denotes a graphic element set, a second element denotes a parameter set, a third element denotes a set of reference attribute values, and a fourth element denotes a reference clip. The description 112d indicates that a straight line from (75, 100) to (300, 100) is plotted in a range of a clip "C1" by using the attribute values of the description 112a shown by "A1". Descriptions 112f and 112g represent region graphic forms, in which a first element denotes a graphic element set, a second element denotes a parameter set, a third element denotes a set of reference attribute values, and a fourth element denotes a reference clip. The description 112f indicates that a range of a region containing the inside of a rectangle having a width of 25 and a height of 100 and a lower left vertex (150, 100) that lies within the clip C1 is fully painted by using the attribute values of the description 112*b* shown by "A2".

While the internal representation 112 is described in the form of text data as described above, the present invention is not limited to the text data. In actual practice, the internal representation 112 is realized as structured data on a memory. In this case, when the internal representation is realized as data on the memory as described above, there are used several methods such as using pointers instead of reference names.

Figure 5:
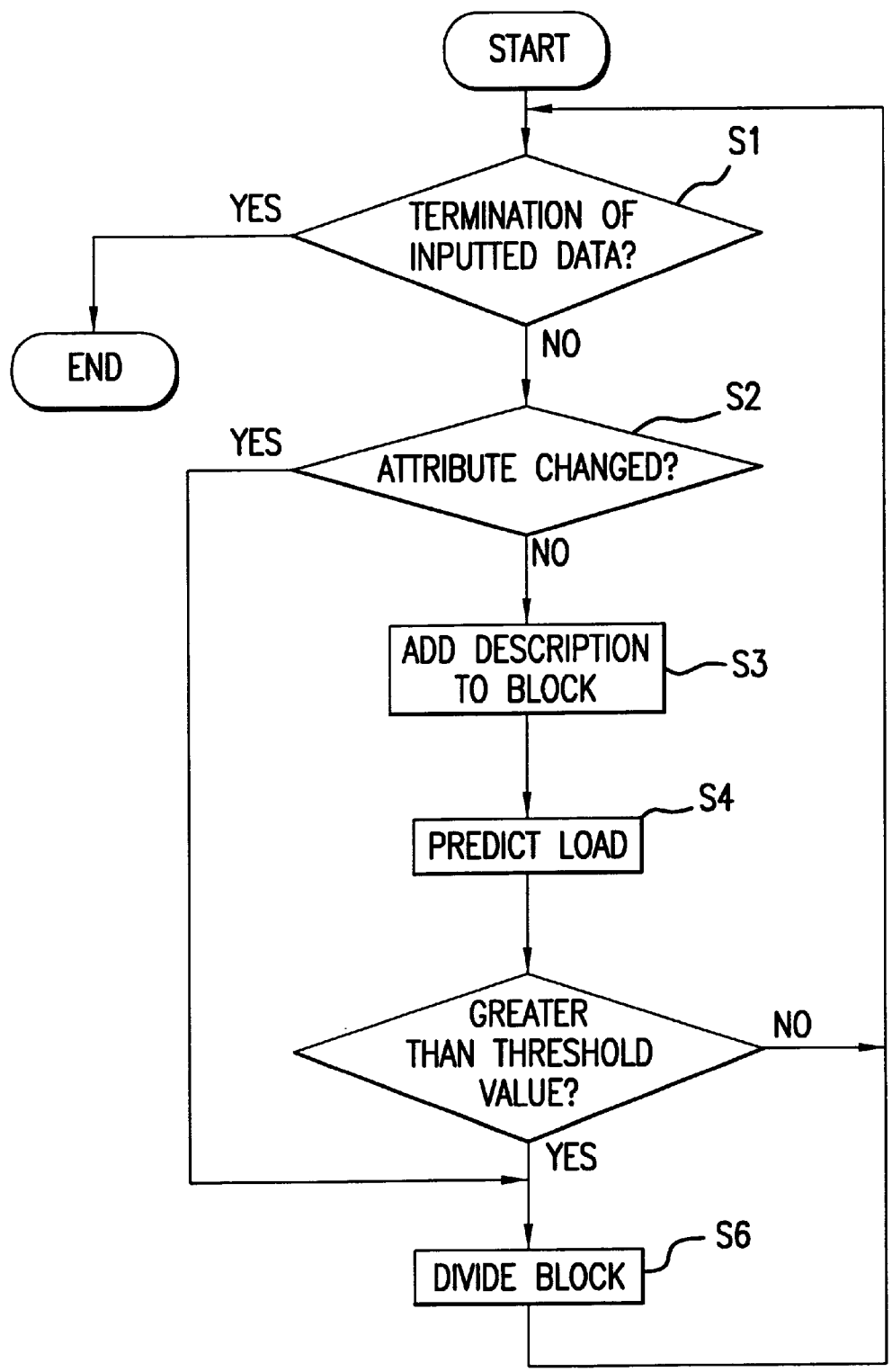
FIG. 5 is a flowchart to which reference will be made in explaining a flow of a block dividing processing.

Referring back to FIG. 3, the block dividing unit 12 divides the internal representation 112 of the intermediate format generated from the instruction analyzing unit 11 into blocks. A standard with which the internal representation 112 is divided by the block dividing unit 12 is obtained by specifying the attribute with the dividing instructing unit 13. The block dividing unit 12 divides the internal representation 112 of the intermediate format in such a manner that a set of plotting elements which commonly refer to the attribute value indicated by the dividing instructing unit 13 may fall within the same block. When the dividing instructing unit 13 specifies the attribute values, there may be used an exclusively-designed user interface or a communication with other control programs. According to the method using the communication with other control programs, considering a resource and a capability of the whole of the system, it is possible to automatically provide a proper dividing method and a proper parameter. At the same time the block is divided, a plotting load is predicted based on the number of the plotting elements within the blocks and complexities of the plotting elements. When the predicted load exceeds the predetermined threshold value, the block is further divided into blocks. As the predicted load, there may be used values which are obtained by simple methods such as multiplying the number primitive figures which define a graphic elements for example, in a graphics graphic form, a length of plotting character set, for example, in a text and a size of image data, for example, in an image with proper weighting coefficients considering the respective processing loads. FIG. 5 shows a flow of a processing executed by this block dividing unit 12.

FIG. 5 is a flowchart showing the flow of the block dividing processing. Since inputted data is analyzed sequentially until it is divided by the block dividing unit 12, initially, it is determined at a decision step S1 whether or not inputted data is terminated. If the inputted data is terminated as represented by a YES at the decision step S1, then the block dividing processing is ended. If on the other hand the inputted data is not terminated as represented by a NO at the decision step S1, then control goes to the next decision step S2, wherein it is determined whether or not a description reference attribute of the target internal representation 112 is the same as the preceding description reference attribute. That is, the description reference attribute is held and it is checked whether or not such attribute is changed in somewhere of the processing. If the attribute is not changed as represented by a NO at the decision step S2, then control goes to a step S3, whereat the target description is added to the present block. Then, control goes to the step S4, wherein there is predicted a load imposed upon the plotting unit when this block is distributed to the plotting unit and the plotting unit graphically represents an image in actual practice. Control goes to the next decision step S5, whereat it is determined whether or not a sum total of predicted loads within the same block exceeds a previously-determined threshold value. If the total value of the predicted loads of the present block is not greater than the threshold value as represented by a NO at the decision step S5, then control goes back to the step S1, whereat the next description is checked. If the total value of the predicted loads exceeds the threshold value as represented by a YES at the decision step S5, then the processing on the present block is ended, and control goes to a step S6, whereat another block is processed. Specifically, when the block of the same attribute becomes large and its predicted load becomes greater than the threshold value, that block is ended and is divided one more time. Thus, the load of one block is prevented from increasing. If the attribute is changed as represented by a YES at the decision step S2, then the content of the processing is changed. Thus, the present block is ended, and control goes to another block.

Figures 6A, 6B:
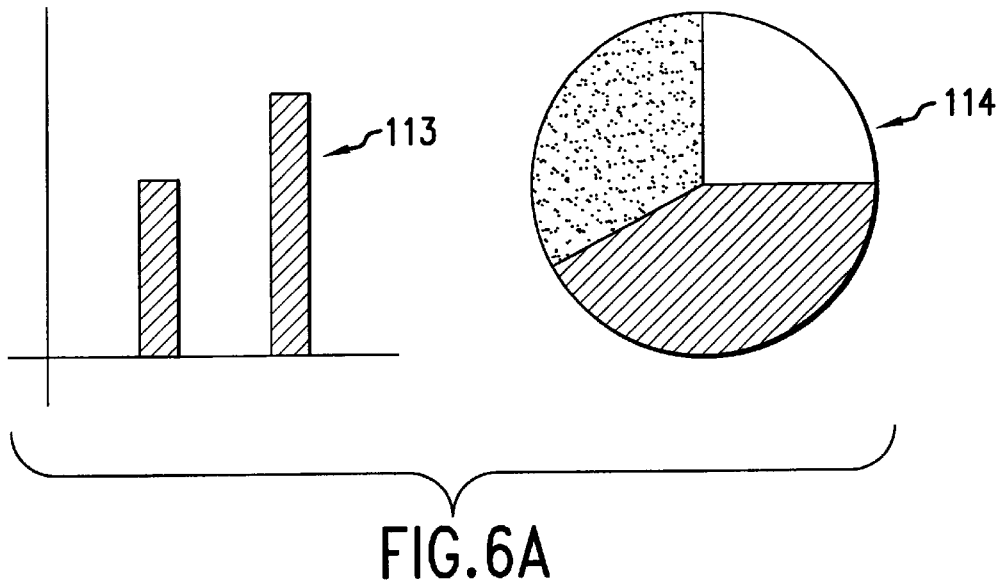

In this fashion, the internal representation is divided into blocks. FIGS. 6A, 6B, and 6C show concretely the manner in which the internal representation is divided into blocks.

FIGS. 6A, 6B, and 6C are diagrams showing examples of the manner in which the internal representation is divided into blocks. FIG. 6A shows a graphic form to be plotted; FIG. 6B shows an example of internal representations of the graphic forms to be plotted; and FIG. 6C shows example of the manner in which the internal representations are divided into blocks. As graphic forms to be plotted, there are two graphs 113 and 114 shown in FIG. 6A. FIG. 6B shows an internal representation 115 corresponding to these graphs 113 and 114. According to the internal representation 115, each graphic form to be plotted comprises plotting elements and attributes to which these plotting elements refer. Then, this internal representation is divided into two blocks 116 and 117 as shown in FIG. 6C.

At that time, an instruction that a set of plotted graphic forms which refer to a common clip are divided into blocks and a threshold value which a sum of plotting loads of plotted graphic forms contained in the divided blocks should not exceed are supplied to the dividing instructing unit 13 in advance. In this embodiment, blocks are composed of a set of plotted graphic forms which commonly refer to a clip C1 or C2 and a set of clips and attributes which are referred to by these plotted graphic forms.

Figure 7:
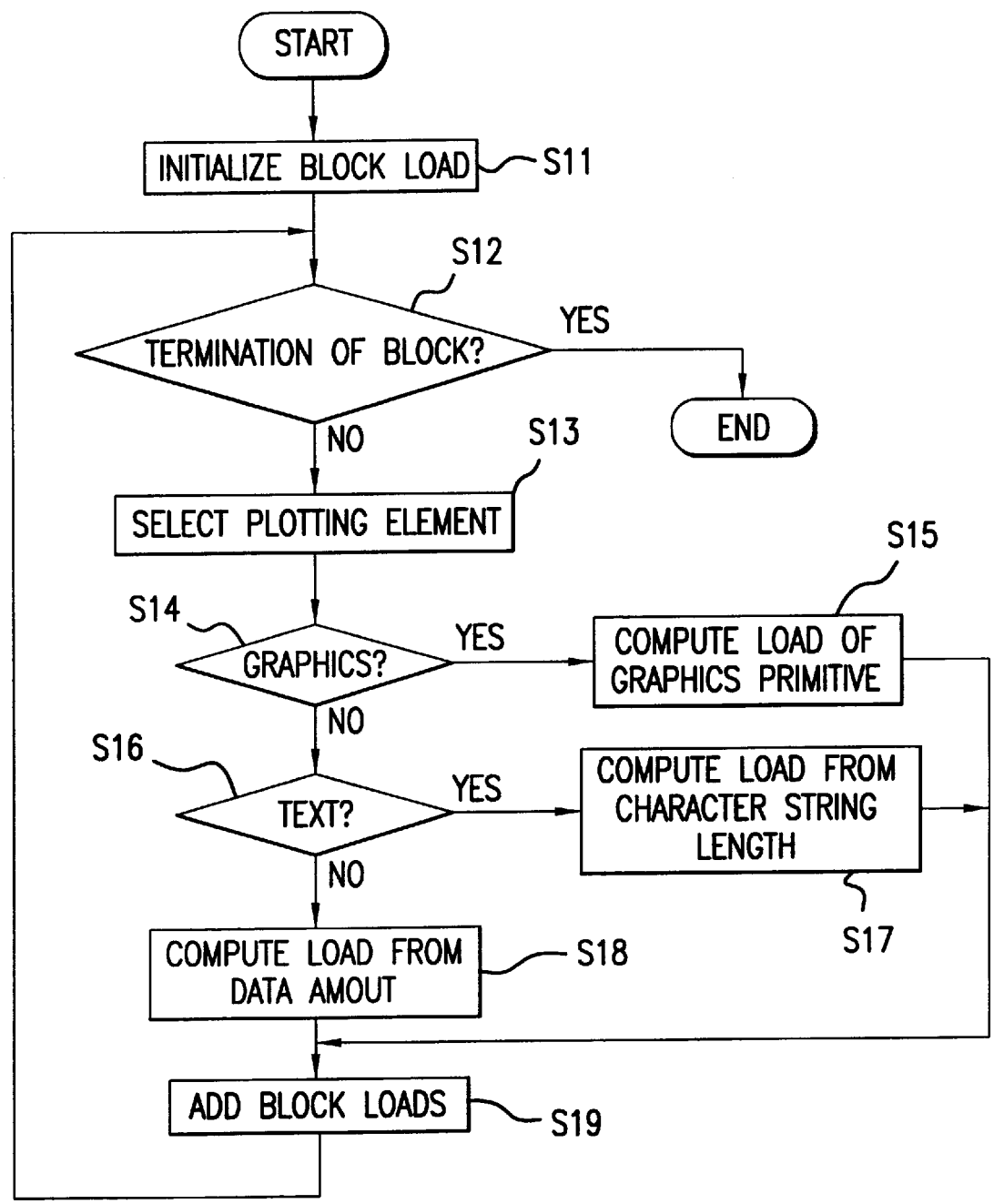
FIG. 7 is a flowchart showing a flow of a block load predictive processing.

Values of predicted loads can be determined simply by checking graphic form elements and by multiplying weighting coefficients corresponding to plotting loads, for example, "1" to a graphic form element "line", "4" to a graphic form element "rect" and "3" to a graphic form element "arc". Further, values of predicted loads can be simply obtained by multiplying weighting coefficients corresponding to the kinds of plotting elements, for example, "2" to "shape" which represents a line stroked graphic form and "1" to "region" which represents a region graphic form. If the above illustrated values are used as they are, then the predicted load of the block 116 becomes "12", and the predicted load of the block 117 becomes "15". Here, if a threshold value of a predicted load is set to "20", then the blocks 116 and 117 need not be divided into blocks again. However, if the threshold value of the predicted load is set to "13", then the block 117 has to be further divided into blocks. This threshold value may be determined in response to a capability of a plotting unit which executes a plotting processing. The above-mentioned values are used for the sake of explanation, and the present invention may not limit these values. FIG. 7 shows a flow of a processing which is executed in order to obtain predicted loads.

FIG. 7 is a flowchart showing the flow of the processing in which loads of blocks are predicted. Referring to FIG. 7, and following the start of operation, control goes to a step S11, whereat a load of a block is initialized. Then, control goes to the next decision step S12, whereat it is determined whether or not the block is terminated. If the block is not terminated as represented by a NO at the decision step S12, then control goes to a step S13, whereat a plotting element is selected from a description of an internal representation. If on the other hand the block is terminated as represented by a YES at the decision step S12, then control is ended. Then, control goes to the next decision step S14, whereat it is determined whether or not the selected plotting element is a graphic form. If the selected plotting element is the graphic form as represented by a YES at the decision step S14, then control goes to a step S15, whereat a load of an element graphic form is calculated. If on the other hand the selected plotting element is not the graphic form as represented by a NO at the decision step S14, then control goes to the next decision step S16, whereat it is determined whether or not the selected plotting element is a text. If the selected plotting element is the text as represented by a YES at the decision step S16, then control goes to a step S17, whereat a load is calculated from a character set length. If the selected plotting element is not the text as represented by a NO at the decision step S16, then the selected plotting element is an image, and hence control goes to a step S18, whereat a load is calculated from its data amount. Then, control goes to a step S19, whereat calculated loads are added and a load as a block is obtained. Thereafter, control goes back to the step S12.

Referring back to FIG. 3, the block distributing unit 14 distributes blocks by distributing a block generated from the block dividing unit 12 to selected one plotting unit whose load is smallest in a plurality of plotting units 16a, 16b, 16c, and 16d. A flow of this distribution processing is illustrated in FIG. 8.

Figure 8:
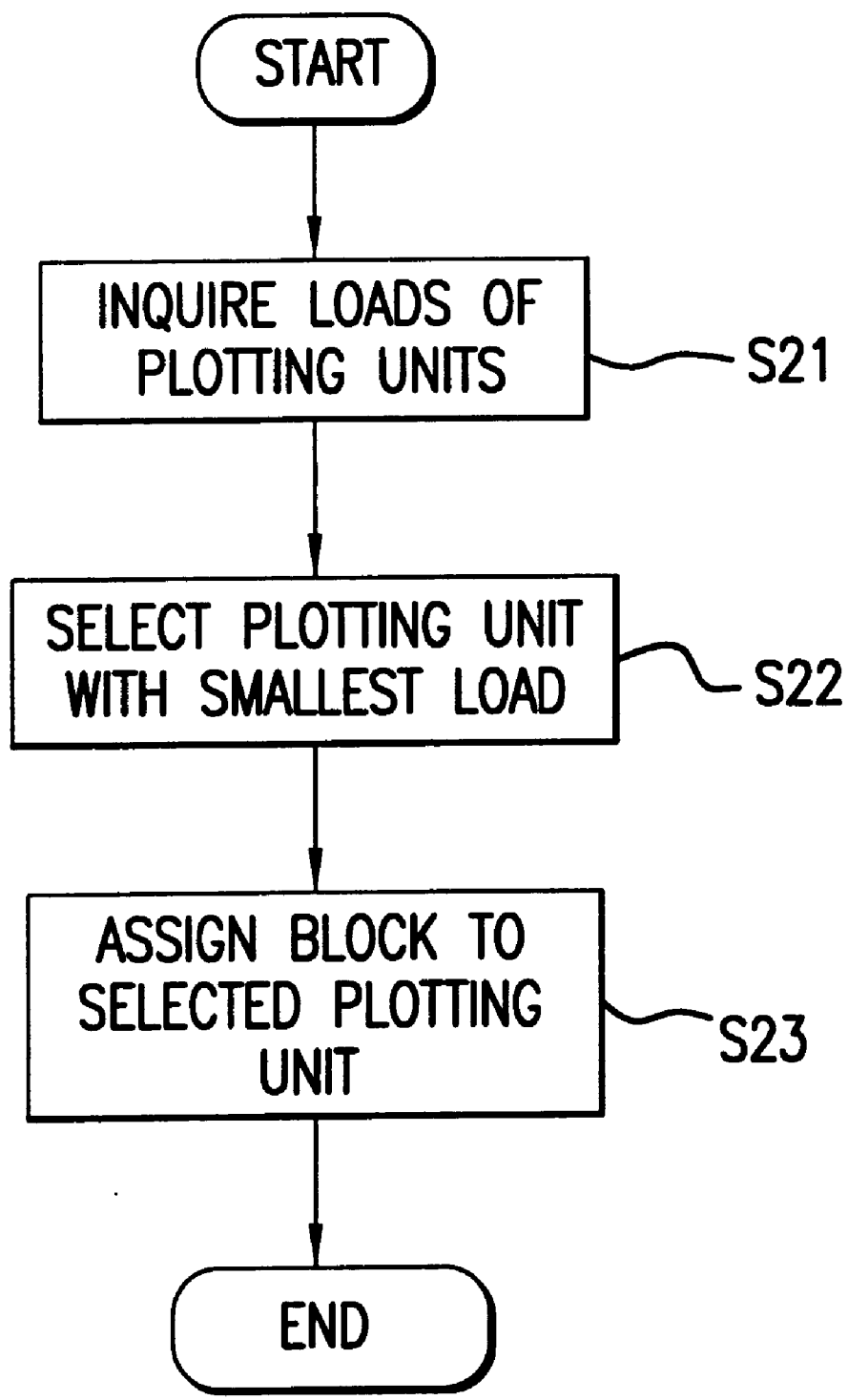
FIG. 8 is a flowchart showing a flow of a processing in which divided blocks are distributed.

FIG. 8 is a flowchart showing the manner in which divided blocks are distributed. Referring to FIG. 8, and following the start of operation, control goes to a step S21, whereat the block distributing unit 14 inquires loads to a plurality of plotting units 16a, 16b, 16c, and 16d. Then, control goes to a step S22, whereat a plotting unit whose load is smallest is selected from the plotting units 16a, 16b, 16c, and 16d based on the loads thus obtained by the inquiry of the block distributing unit 14. Then, control goes to a step S23, whereat the block sent from the block dividing unit 12 is distributed to the selected plotting unit. Then, control is ended.

The respective plotting units 16a, 16b, 16c, and 16d to which the blocks are distributed are adapted to create images corresponding to page portions by creating and preserving pixel representations of pixel formats corresponding to plotting elements which appear within the blocks. Then, the page synthesizing unit 17 creates data of one page on the page buffer 18 by extracting partial data of pages generated from the plotting units 16a, 16b, 16c, and 16d and by storing them at predetermined positions of the page buffer 18. At that time, if a dividing standard instructed by the dividing instructing unit 13 is set in the clips, then accesses to the memory regions within the page buffers corresponding to a plurality of clips can be distributed to individual plotting units, thereby making it possible to reduce a conflict of the accesses to the page buffer 18.

The manner in which the image forming apparatus 10 processes a document created by the client in actual practice will be described next.

Figure 9:
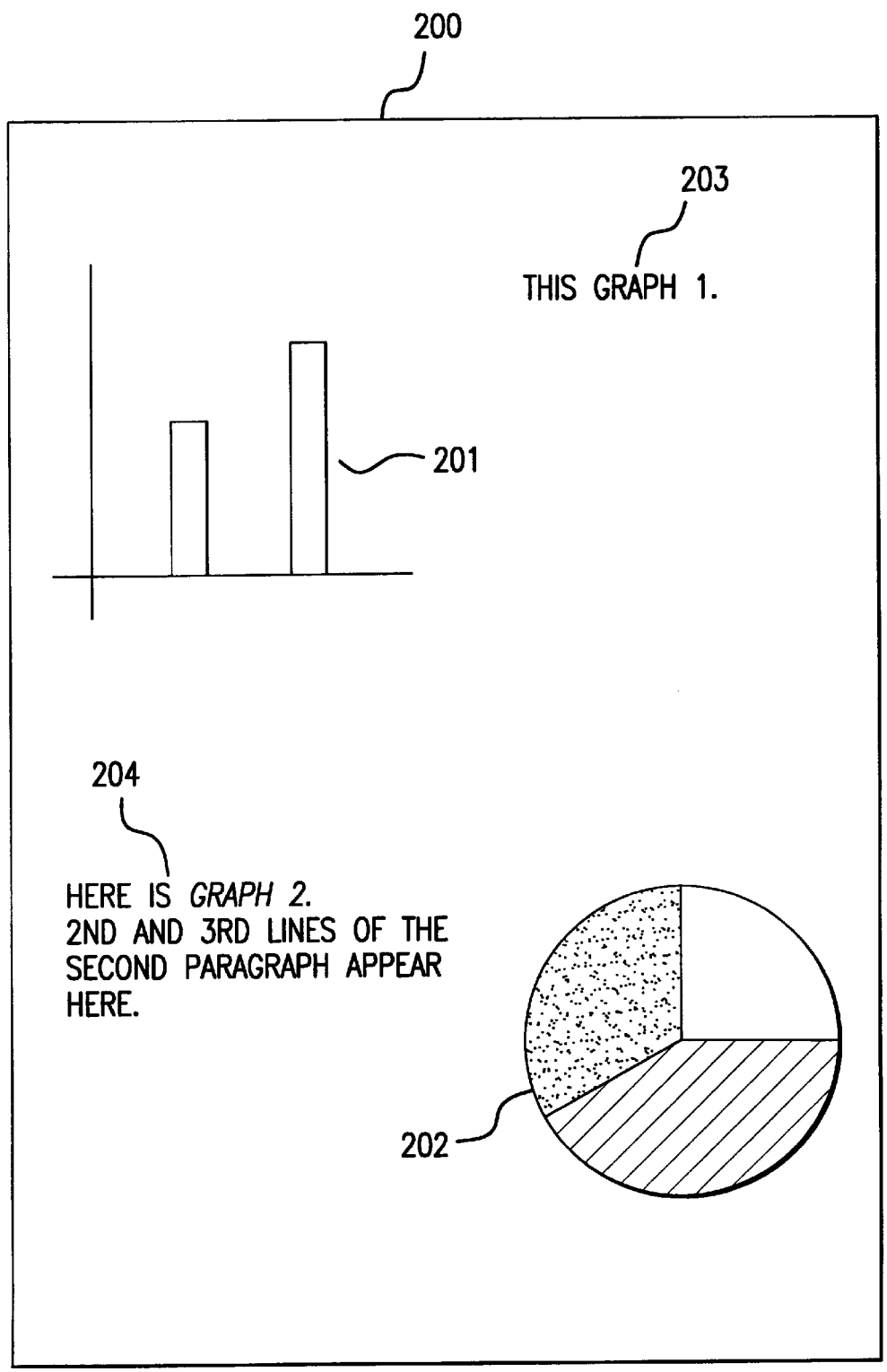
FIG. 9 is a diagram showing an example of a document created on a client computer.

FIG. 9 shows an example of a document created on a client computer. In FIG. 9, a document 200 is created by a client computer 31. According to this document 200, two plotting graphic forms 201 and 202, and two texts 203 and 204 are created on one page. The document 200 thus created is converted into a representation based on a page description language when it is transmitted through the network 20 to the image forming apparatus 10.

FIG. 10 is a diagram showing an example in which document data is converted into a representation based on the page description language. The client computer 31 converts the document 200 into a representation 210 based on the page description language. Here, this representation 210 is indicated by a representation method based on the above-mentioned PostScript, for example. According to this representation 210, initially, a plotted graphic form 201 is described, texts 203 and 204 are described next, and a plotted graphic form 202 is described finally.

The representation 210, based on the page description language, of this document 200 is supplied through the network 20 to the instruction analyzing unit 11 of the image forming apparatus 10. The instruction analyzing unit 11 receives, interprets the representation 210 based on the page description language and generates an internal representation of a corresponding intermediate format.

FIG. 11 is a diagram showing the internal representation generated by the internal analyzing unit 11. The internal analyzing unit 11 sequentially interprets the representation 210 based on the page description language, and generates an internal representation 211 of a corresponding intermediate format. Similarly to the representation based on the page description language, this internal representation 211 also comprises a plotting graphic form 201, texts 203 and 204, and a plotting graphic form 202, in that order. Then, the internal representation 211 thus generated is supplied to the block dividing unit 12, in which it is divided into blocks.

FIG. 12 is a diagram showing the internal representation which is divided into blocks. The block dividing unit 12 divides the internal representation 211 supplied from the instruction analyzing unit 11 into four blocks 212, 213, 214, and 215. Here, the block dividing unit 12 divides the internal representation 211 in such a manner that a set of plotting elements which refer to the same clip are collected into a block. When the internal representation 211 is divided into block, loads required by plotting blocks are calculated at the same time, and the internal representation 211 is divided into blocks in such a manner that the obtained values may not exceed a previously-determined value.

According to this embodiment, since the loads of the plotting graphic forms 201 and 202 and the texts 203 and 204 are not greater than the previously-determined value, the internal representation 211 is divided into four blocks. While the clip is used as a dividing standard as described above, the present invention may not use such clip as only the dividing standard, and attributes such as colors and patterns of dotted lines and a combination of these attributes may be used as the dividing standard.

The four blocks 212, 213, 214, and 215 thus divided are distributed to the plotting units having smaller loads in a plurality of plotting units 16a, 16b, 16c, and 16d. The respective plotting units 16a, 16b, 16c, 16d are operated in parallel to each other, and generate the pixel representations corresponding to the plotting pixels contained in the distributed blocks.

Figure 13:
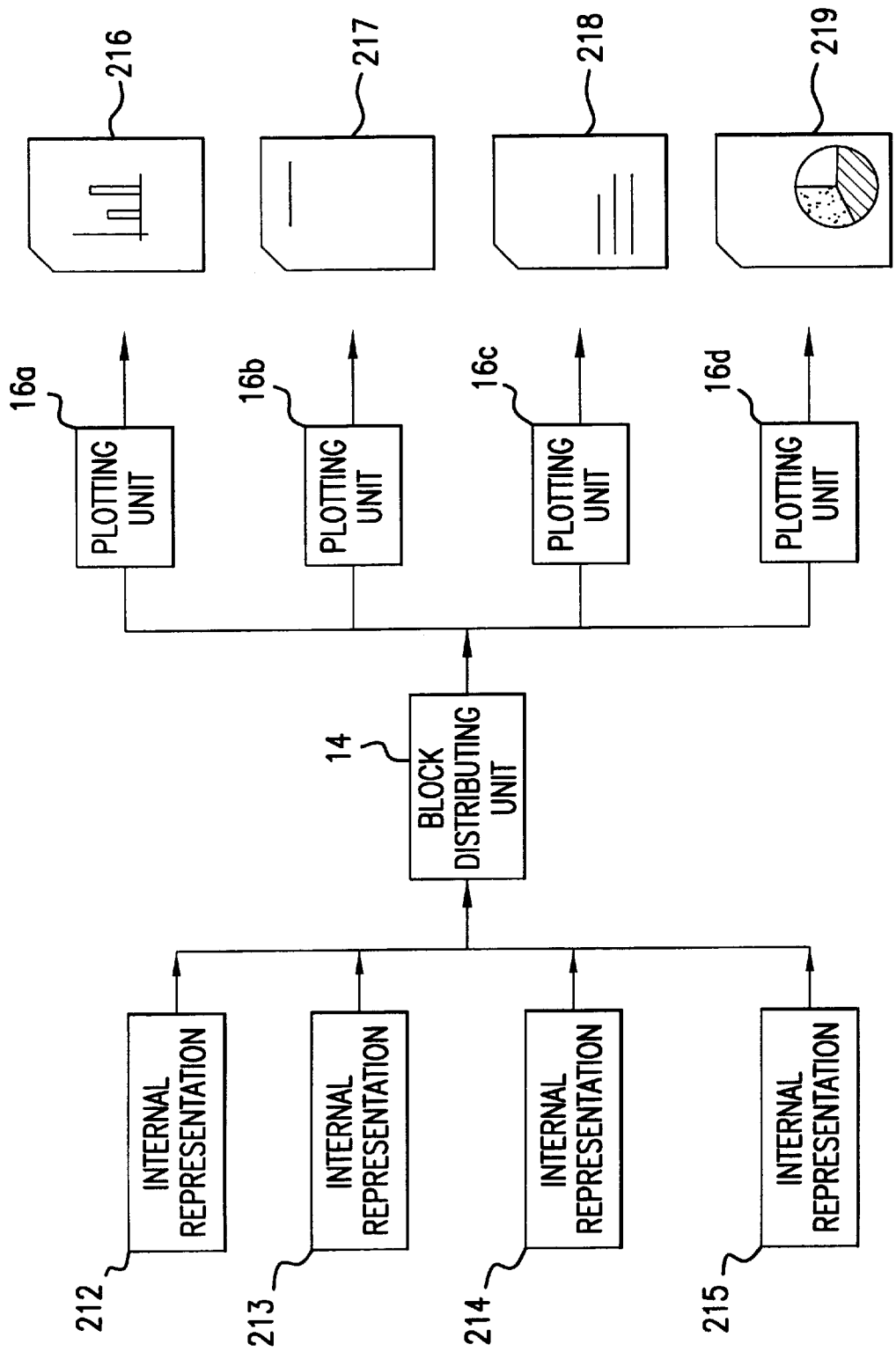
FIG. 13 is a diagram showing a flow of a processing in which partial data are generated by distributing blocks.

FIG. 13 is a diagram showing the manner in which blocks are distributed to the plotting units and the plotting units generate partial data. The divided blocks 212, 213, 214, and 215 are distributed by the block distributing unit 14 to the plotting units, respectively. In the illustrated example, the block 212 is distributed to the plotting unit 16a, the block 213 is distributed to the plotting unit 16b, the block 214 is distributed to the plotting unit 16c, and the block 215 is distributed to the plotting unit 16d. The plotting units 16a, 16b, 16c, 16d convert the internal representations of the inputted blocks into pixel representations, respectively. Thus, the plotting units 16a, 16b, 16c, 16d generate partial data 216, 217, 218, and 219 of pixel representations composing a part of page data.

Figure 14:
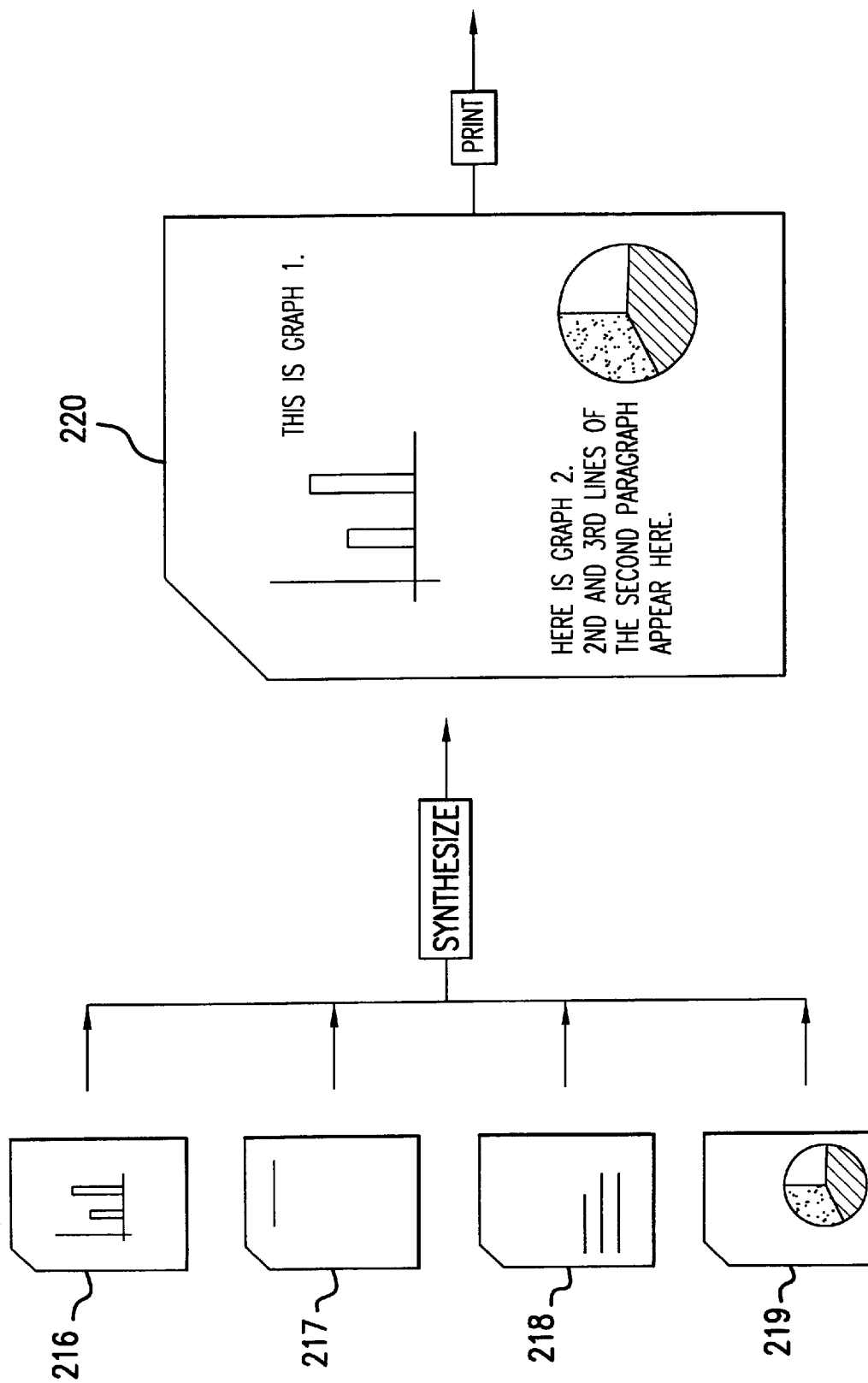
FIG. 14 is a diagram showing a flow of a processing in which partial data are synthesized.

FIG. 14 is a diagram showing the manner in which the partial data are synthesized. As shown in FIG. 14, the partial data 216, 217, 218, and 219 generated by the plotting units 16a, 16b, 16c, 16d are sent by the page synthesizing unit 17 to the page buffer 18, in which they are synthesized with page image data. Print data 220 of one page is supplied through the print interface 19 to the print engine 40 and thereby printed out.

If the inputted data based on the page description language is interpreted and executed according to the above-mentioned method, then there may be obtained the blocks which can be executed in parallel and which have a small difference of plotting loads by the simple method. Therefore, it becomes possible to provide a high-speed printer in which a plurality of plotting units can be efficiently operated in parallel to each other.

Another embodiment in which the present invention is applied to a network printing system will be described below.

Figure 15:
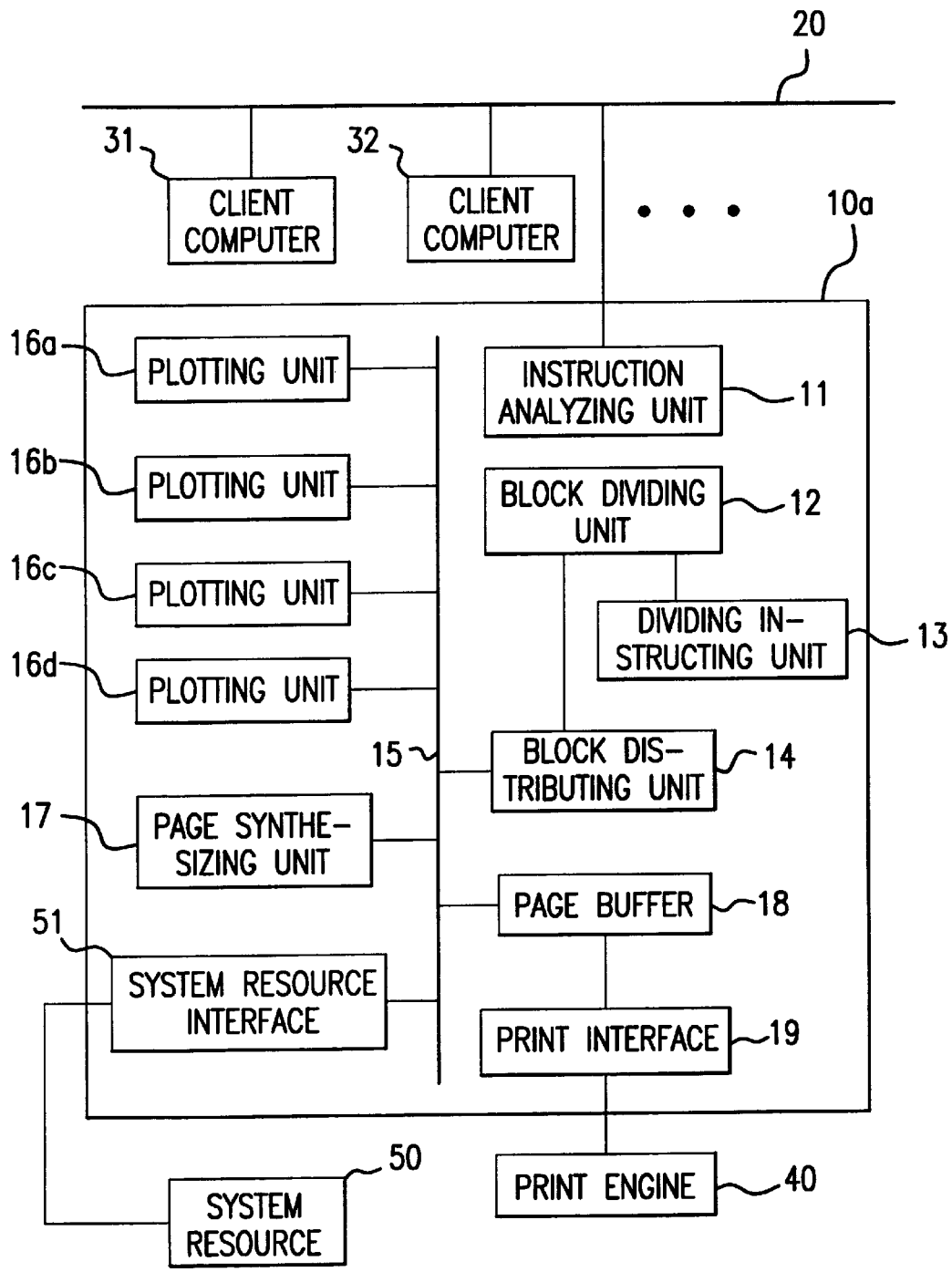
FIG. 15 is a block diagram showing a network printing system.

FIG. 15 is a block diagram showing the network printing system. In FIG. 15, elements and parts identical to those of the network printing system shown in FIG. 2 are marked with the same references and therefore need not be described in detail. As shown in FIG. 15, an image forming apparatus 10a according to this embodiment includes a system resource interface 51 connected to the bus 15 in addition to the instruction analyzing unit 11, the block dividing unit 12, the dividing instructing unit 13, the block distributing unit 14, the bus 15, the plotting units 16a, 16b, 16c, 16d, the page synthesizing unit 17, the page buffer 18, and the print interface 19. This system resource interface 51 is connected to a system resource 50. As the system resource 50, there may be used file system on a computer, fonts, a built-in hardware accelerator as a part of the system, etc.

In the arrangement of this image forming apparatus 10a, the print job created by the client computer 31 or 32 is supplied through the network 20 to the instruction analyzing unit 11. The instruction analyzing unit 11 interprets the content of the received print job in accordance with the grammar of the page description language, and generates an internal representation of an intermediate format independent of the page description language. The internal representation thus generated is supplied to the block dividing unit 12, in which it is divided into blocks in accordance with the standard instructed by the dividing instructing unit 13 and then supplied to the block distributing unit 14. The block distributing unit 14 distributes the divided blocks to any one of a plurality of plotting units 16a, 16b, 16c, and 16d. The plotting units 16a, 16b, 16c, and 16d which can be operated in parallel to each other are adapted to plot an image in accordance with the internal representation of the intermediate format contained in the blocks distributed from the block distributing unit 14. At that time, the image forming apparatus 10a accesses the system resource 50 through the system resource interface 51, if necessary. The page synthesizing unit 17 synthesizes plotted results of the plotting units and generates an image of one page on the page buffer 18. The image thus generated is supplied through the print interface 19 to the print engine 40 and thereby printed out.

An operation of the instruction analyzing unit 11 is similar to that of the first embodiment shown in FIG. 2 and therefore need not be described. The block dividing unit 12 divides the internal representation of the intermediate format generated by the instruction analyzing unit 11 into blocks. The dividing standard is supplied to the block dividing unit 12 when the dividing instructing unit 13 specifies a system resource. The block dividing unit 12 divides the internal representation in such a manner that a set of plotting elements sharing the same system resource are collected into the same block. At the same time, the block dividing unit 12 predicts the load of the plotting based on the number of the plotting elements within the block and the complexities of the plotting elements, and further divides the divided blocks if the predicted load exceeds a previously-determined threshold value. Operations of the block distributing unit 14, the plotting units 16a, 16b, 16c, 16d and the page synthesizing unit 17 are similar to those of the first embodiment shown in FIG. 2 and therefore need not be described.

If the image forming apparatus according to the present invention is arranged on a general purpose computer, then a conflict of accessing the common resource such as the file system, the fonts and the hardware accelerator on the computer can be reduced. Thus, it becomes possible to provide a high-speed printer system in which a plurality of plotting units may be efficiently operated in parallel to each other.

The manner in which the image forming apparatus 10a processes a document created by the client in actual practice will be described next.

Figure 16:
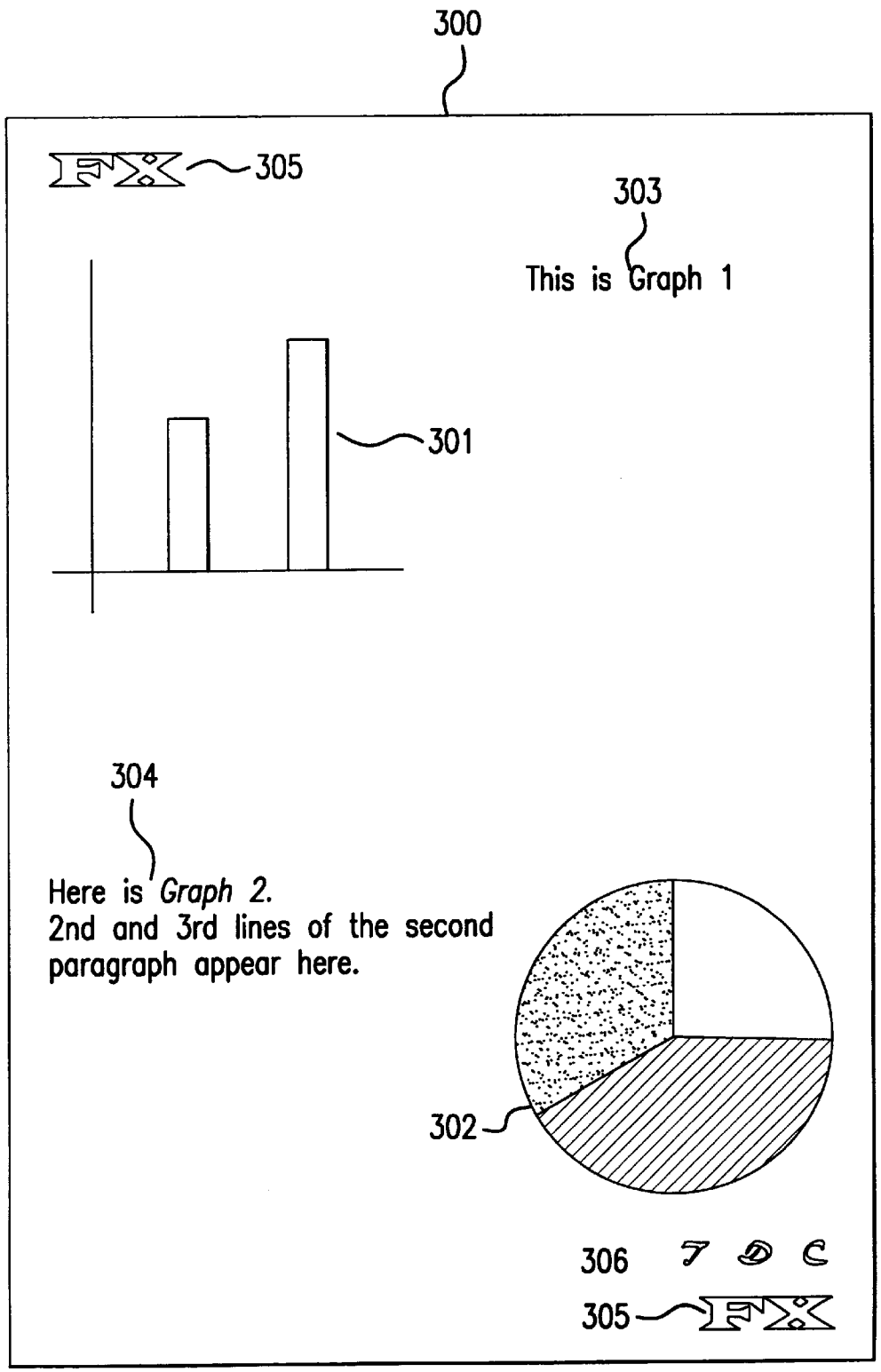
FIG. 16 is a diagram showing an example of a document created on a client computer.

FIG. 16 is a diagram showing an example of a document created on the client computer. An illustrated document 300 is created by the client computer 31. According to the document 300, two plotting graphic forms 301 and 302, two texts 303 and 304, and two kinds of images 305 and 306 are created on one page. The document 300 thus created is converted into a representation based on the page description language, and supplied through the network 20 to the image forming apparatus 10a. The instruction analyzing unit 11 in the image forming apparatus 10a analyzes the representation based on the page description language and converts the same into the internal representation of the intermediate format.

FIG. 17 is a diagram showing an internal representation generated by the instruction analyzing unit 11. FIG. 18 is a diagram showing an internal representation which is divided into blocks. The representation based on the page description language is interpreted sequentially and thereby an internal representation 310 of a corresponding intermediate format is generated. In this internal representation 310, "image" represents that an image is plotted, and "import" represents that image data is obtained through the system resource interface 51 from the system resource 50 located outside the image forming apparatus 10a. Plotting elements which refer to such system resource 50 are collected into the same block 311. Plotting graphic forms 301 and 302 and texts 303 and 304 serving as other plotting elements are respectively collected into blocks 312, 313, 314, and 315.

If a description for obtaining image data appears in a plurality of blocks, then when the plotting units plot image data, the system resource 50 is accessed by a plurality of plotting units. As a consequence, it is expected that a standby time occurs in the plotting units thereby to lower an efficiency of parallel-processing. Therefore, even though these plotting elements refer to different clips, they are divided such that they may be collected into the same block.

The manner in which the block distributing unit 14 distributes the blocks to the plotting units, the plotted results are synthesized and then printed out is similar to the embodiment shown in FIGS. 13 and 14, and therefore need not be described.

As described above, according to the present invention, the inputted page description language is temporarily converted into the internal representation of the intermediate format which is independent of the language, and this internal representation should be divided. Thus, since the representations divided such that a plurality of converting means may convert the internal representations into the pixel representations in parallel are representations obtained after the interpretation, the internal representation can be divided in the form of the correct state-independent. Moreover, when the internal representation is divided into blocks, plotting graphic forms which refer to a common plotting attribute are collected into one block. Therefore, reference targets are collected into one reference target, and hence the processing can be optimized and executed at high speed. Furthermore, since the plotting graphic forms which use the common system resource such as the fonts are collected into one block, a conflict of the accesses to the system resource can be avoided.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An image forming apparatus for forming an output image by executing an image plotting instruction described in a page description language, comprising:

interpreting means for generating an intermediate representation that is independent of the page description language by interpreting a representation based on an inputted page description language in accordance with a grammar of said page description language, said interpreting means generating said intermediate representation without first dividing said image plotting instruction into blocks;

dividing means for dividing the generated intermediate representation of a language independent format into blocks;

particle size designating means for designating a particle size of division required when said dividing means divides said intermediate representation into blocks;

a plurality of converting means for converting respective blocks of said divided intermediate representations into pixel representations;

distributing means for distributing blocks of said intermediate representations divided by said dividing means to said plurality of converting means; and synthesizing means for synthesizing said pixel representations respectively generated from said plurality of converting means.

2. An image forming apparatus as claimed in claim 1, wherein said plurality of converting means convert intermediate representations of respectively distributed blocks into pixel representations in parallel to each other.

3. An image forming apparatus as claimed in claim 1, wherein said particle size designating means supplies a dividing instruction to said dividing means in such a manner that intermediate representations having a common plotting attribute are collected into one block.

4. An image forming apparatus as claimed in claim 1, wherein said dividing means includes load predicting means for monitoring a plotting load of an intermediate representation within a divided block and further dividing divided blocks when said plotting load exceeds a previously-designated load.

5. An image forming apparatus as claimed in claim 4, wherein said particle size designating means includes means for designating a load required to determine whether or not blocks divided by said dividing means are further divided.

6. An image forming apparatus as claimed in claim 2, wherein said particle size designating means supplies a dividing instruction to said dividing means in such a manner that the intermediate representations which refer to a common resource are collected into one block.

7. An image forming apparatus as claimed in claim 1, wherein said interpreting means includes first interpreting means for interpreting said image plotting instruction in accordance with a grammar thereof and second interpreting means for converting an interpreted result of said first interpreting means into data of a format independent of said grammar and whose meaning of data is independent of preceding and succeeding data.

8. An image forming apparatus as claimed in claim 7, wherein said second interpreting means includes block means for generating blocks by collecting plotting objects from an interpreted result of said first interpreting means, encoding means for encoding plotting objects belonging to specific blocks collected to said block means and copying means for copying plotting attributes referred to by plotting objects belonging to said specific blocks into said specific blocks.

9. An image forming apparatus as claimed in claim 3, wherein said common plotting attribute is a clip.

* * * * *